US008243376B2

(12) United States Patent
Kuo (10) Patent No.: US 8,243,376 B2
(45) Date of Patent: Aug. 14, 2012

(54) LENS MODULE

(75) Inventor: Meng-Hsin Kuo, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 12/724,788

(22) Filed: Mar. 16, 2010

(65) Prior Publication Data

US 2011/0141585 A1 Jun. 16, 2011

(30) Foreign Application Priority Data

Dec. 15, 2009 (TW) .................................. 98142867 A (51) Int. Cl.
*G02B 7/02* (2006.01)
(52) U.S. Cl. .......................................................... 359/811
(58) Field of Classification Search .................. 359/811, 359/407–410, 420
See application file for complete search history.

(56) References Cited

U.S. PATENT DOCUMENTS

| 5,110,205 | A * | 5/1992 | Suzuki et al. .................. 356/135 |
| 7,423,821 | B2 * | 9/2008 | Bechtel et al. ................. 359/796 |
| 7,551,358 | B2 * | 6/2009 | Lee et al. ........................ 359/621 |
| 7,746,576 | B2 * | 6/2010 | Lee ................................... 359/811 |
| 2005/0270660 | A1 * | 12/2005 | Chen et al. ..................... 359/668 |

* cited by examiner

*Primary Examiner* — Scott J Sugarman
*Assistant Examiner* — Vipin Patel
(74) *Attorney, Agent, or Firm* — Rosenberg, Klein & Lee (57) ABSTRACT

A lens module includes a base, and first and second lens units. The base defines a receiving space, and has two spaced-apart through holes for fluid communication of the receiving space with an area external to the base. The first lens unit is disposed within the receiving space, and defines a first light communicating path that corresponds in position to one of the through holes. The second lens unit is disposed within the receiving space in a side-by-side manner with the first lens unit, and defines a second light communicating path that corresponds in position to the other one of the through holes.

7 Claims, 8 Drawing Sheets

LENS MODULE

CROSS-REFERENCE TO RELATED APPLICATION

This application claims priority of Taiwanese Application No. 098142867, filed on Dec. 15, 2009.

BACKGROUND OF THE INVENTION

1. Field of the Invention

This invention relates to a lens module, more particularly to a lens module having two lens units respectively defining light communicating paths.

2. Description of the Related Art

Figure 1:
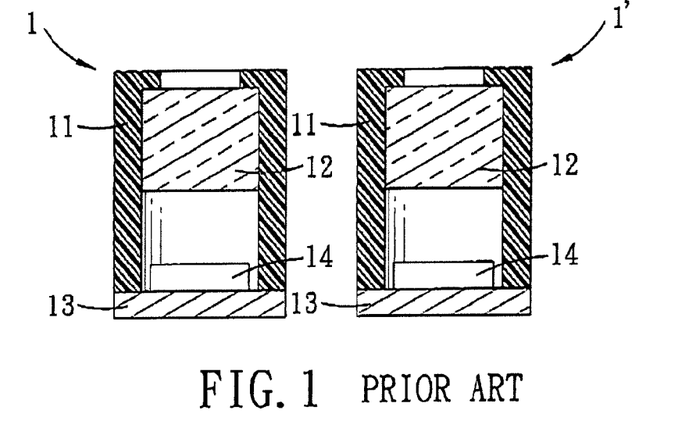
FIG. 1 is a sectional view of two conventional image capturing devices.
Figure 2:
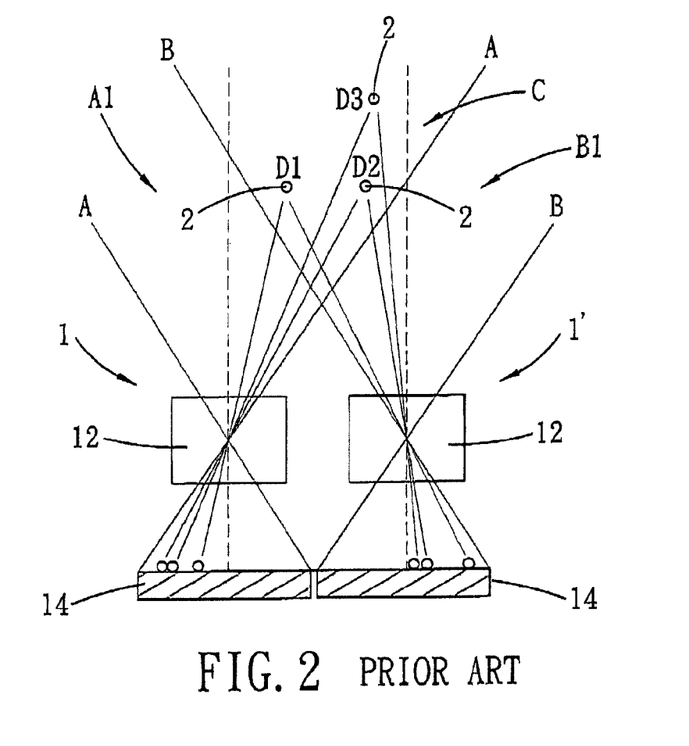
FIG. 2 is a schematic view, illustrating how the two conventional image capturing devices form an image of an object.

Referring to FIGS. 1 and 2, currently, to determine the coordinate position of an object in a three dimensional space, at least two spaced-apart image capturing devices 1, 1' are required to perform an image capturing operation. Both of the two image capturing devices 1, 1' are simultaneously assembled on an electronic device (not shown). Each image capturing device 1, 1' includes a base 11, a lens unit 12 fixed within the base 11, a circuit board 13 welded to a bottom end of the base 11, and a sensor element 14 provided on a top face of the circuit board 13 and spaced apart from and disposed below the lens unit 12. Two intersecting lines (A) passing through the lens unit 12 of the image capturing device 1 define therebetween a viewable region (A1) of the image capturing device 1. Two intersecting lines (B) passing through the lens unit 12 of the image capturing device 1' define therebetween a viewable region (B1) of the image capturing device 1'. An image of an object 2 located on an overlapping region (C) of the viewable regions (A1, B1) is simultaneously formed on the sensor elements 14 of the two image capturing devices 1, 1'.

For example, when the object 2 moves from a first position (D1) to a second position (D2), or from the second position (D2) to a third position (D3), the position of the image of the object 2 formed on the sensor elements 14 through the respective lens units 12 is varied. The sensor elements 14 of the two image capturing devices 1, 1' can transmit the captured image data to a computing unit (not shown) of the electronic device through the circuit board 13 so as to differentiate between the coordinate position and the change in the coordinate position of the object 2 in three dimensional space.

Since the image capturing devices 1, 1' have to be separately manufactured, after which they are assembled on the electronic device, the assembly process thereof is time-consuming, and the manufacturing cost thereof is high. Further, the electronic device must provide a large space to accommodate assembly of the two image capturing devices 1, 1'. Moreover, the components of each image capturing device 1, 1' have specific assembly tolerances during assembly, so that accuracy between the lens units 12 of the two image capturing devices 1, 1' after their assembly on the electronic device cannot be easily controlled.

SUMMARY OF THE INVENTION

Therefore, the main object of the present invention is to provide a lens module having two lens units respectively defining light communicating paths, so that efficiency and accuracy of assembly thereof may be enhanced, and the manufacturing cost thereof can be reduced to a minimum.

The purpose of the present invention and the solution to the conventional technical problems are achieved through employment of the below technical means. According to one aspect of disclosure of the present invention, a lens module comprises a base, and first and second lens units. The base defines a receiving space, and has two spaced-apart through holes for fluid communication of the receiving space with an area external to the base. The first lens unit is disposed within the receiving space, and defines a first light communicating path that corresponds in position to one of the through holes. The second lens unit is disposed within the receiving space in a side-by-side manner with the first lens unit, and defines a second light communicating path that corresponds in position to the other one of the through holes.

According to another aspect of disclosure of the present invention, a lens module comprises first and second lens units. The first lens unit includes at least one first lens that defines a first light communicating path. The second lens unit includes at least one second lens that defines a second light communicating path and that is connected integrally as one piece with said first lens.

Through the aforesaid technical means, the advantages and efficacy of the lens module of the present invention reside in a left-to-right arrangement of the first and second lenses of the first and second lens units, and in the first and second light communicating paths defined respectively by the first and second lenses. Through such a configuration, steps of assembly can be reduced so as to shorten the time required for assembly, thereby reducing the manufacturing costs to a large extent. Further, assembly and positioning precision of the first and second lenses of the first and second lens units can be effectively enhanced, so that accuracy of the lens module after assembly on the electronic device may also be enhanced.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

The above-mentioned and other technical contents, features, and effects of this invention will be clearly presented from the following detailed description of three preferred embodiments in coordination with the reference drawings. Through description of the concrete implementation method, the technical means employed and the efficacy to achieve the predetermined purpose of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Figure 3:
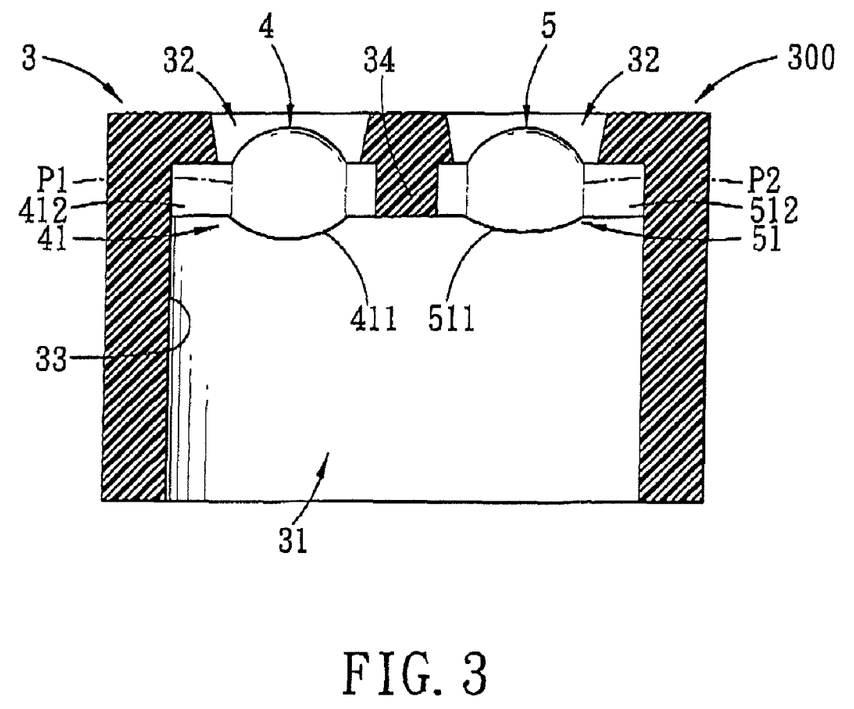
FIG. 3 is a sectional view of a lens module according to the first preferred embodiment of this invention, illustrating a left-to-right arrangement of first and second lenses.

Referring to FIG. 3, a lens module 300 according to the first preferred embodiment of the present invention comprises a base 3, a first lens unit 4, and a second lens unit 5.

The base 3 may be cylindrical or square shaped, is made of plastic, and defines a receiving space 31. The base 3 has a bottom open-end, and a top end formed with two spaced-apart through holes 32 for fluid communication of the receiving space 31 with an area external to the base 3.

The first and second lens units 4, 5 are in a left-to-right arrangement within the receiving space 31, and are disposed in positions corresponding to the through holes 32. In this embodiment, the first lens unit 4 includes a first lens 41 having a light-penetrating portion 411 facing one of the through holes 32, and an annular fixed portion 412 provided on an outer periphery of the light-penetrating portion 411. The fixed portion 412 is disposed between an inner wall face 33 of the base 3 and a partition portion 34 at the center of the top end of the base 33, and is adhered to the inner wall face 33 and the partition portion 34 by using an adhesive. The second lens unit 5 includes a second lens 51 having a light-penetrating portion 511 facing the other one of the through holes 32, and an annular fixed portion 512 provided on an outer periphery of the light-penetrating portion 511. The fixed portion 512 is disposed between the inner wall face 33 of the base 3 and the partition portion 34 of the base 3 opposite to the fixed portion 412, and is adhered to the inner wall face 33 and the partition portion 34 by using an adhesive.

Figure 4:
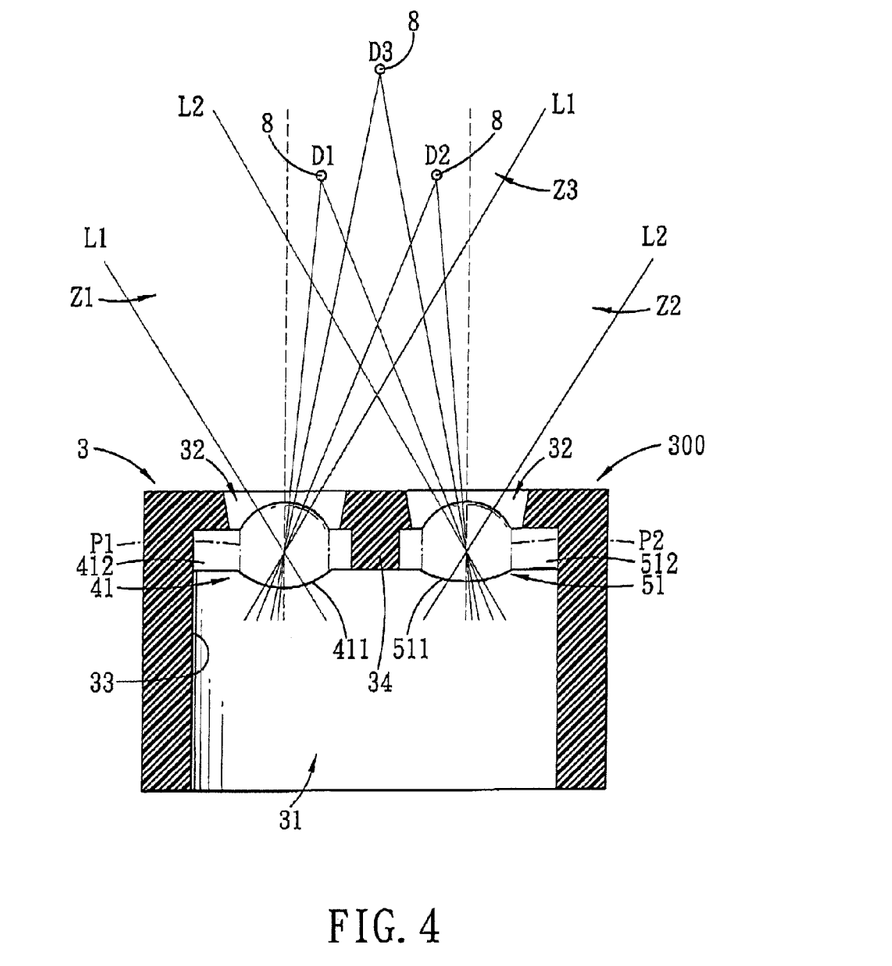
FIG. 4 is a schematic view, illustrating how the lens module of the first preferred embodiment forms an image of an object.

With reference to FIGS. 3 and 4, the light-penetrating portion 411 of the first lens 41 defines a first light communicating path (P1) corresponding in position to one of the through holes 32. The light-penetrating portion 511 of the second lens 51 defines a second light communicating path (P2) corresponding in position to the other one of the through holes 32. Through such a configuration, light rays at the area external to the base 3 can pass through the first and second light communicating paths (P1, P2) via the through holes 32. The first and second light communicating paths (P1, P2) are parallel to each other (shown in FIG. 4 in imaginary lines) in an extended direction and in the area external to the base 3.

The bottom end of the base 3 may be provided with a circuit board (not shown) and a sensor element (not shown). The sensor element detects the light rays passing through the first and second light communicating paths (P1, P2), and transmits a detection signal to the circuit board.

FIG. 4 is a schematic view, illustrating the lens module 300, which is applied to an electronic device (not shown) to capture an image of an object 8, forms an image of the object 8. Two intersecting lines (L1) passing through the first light communicating path (P1) via one of the through holes 32 define therebetween a viewable region (Z1) of the first lens unit 4. Two intersecting lines (L2) passing through the second light communicating path (P2) via the other one of the through holes 32 define therebetween a viewable region (Z2) of the second lens unit 5. An image of the object 8 located within an overlapping region (Z3) of the viewable regions (Z1, Z2) of the first and second lens units 9, 5 can be formed on the sensor element through the first and second lenses 41, 51 of the first and second lens units 4, 5.

For example, when the object 8 moves from a first position (D1) to a second position (D2) or a third position (D3), or when the object 8 moves from the second position (D2) to the first position (D1) or the third position (D3), the position of the image of the object 8 formed on the sensor element through the first and second lenses 41, 51 varies. The sensor element transmits the captured image data to a computing unit (not shown) of the electronic device through the circuit board so as to differentiate between the coordinate position and the change in the coordinate position of the object 8 in three dimensional space.

To manufacture the lens module 300 of this embodiment, one method is to form the base 3 first, after which the base 3 is inverted. The first and second lenses 41, 51 of the first and second lens units 4, 5 are then disposed within the receiving space 31 of the base 3, and the fixed portions 412, 512 of the first and second lenses 41, 51 are adhered to the inner wall face 33 and the partition portion 34 of the base 3. Another method of manufacturing the lens module 300 is to form the base 3 on the first and second lenses 41, 51 of the first and second lens units 4, 5 by an insert molding process.

During manufacture of the lens module 300, the first and second lenses 41, 51 of the first and second lens units 4, 5 are simultaneously assembled within the receiving space 31 of the base 3, after which the circuit board and the sensor element are connected to the base 3. The lens module 300 can then be directly assembled on the electronic device. Hence, in comparison with the conventional technique, the number of assembly steps of the present invention can be reduced, assembly time can be shortened, and the size of the lens module 300 can be reduced so that the lens module 300 does not occupy a large space in the electronic device. Further, by assembling the first and second lenses 41, 51 of the first and second lens units 4, 5 to the same base 3, in comparison with the conventional technique, provision of an additional base is not necessary so that the manufacturing cost thereof can be minimized. As a result, the production cost of the lens module 300 can be reduced to a large extent. Moreover, since the first and second lenses 41, 51 of the first and second lens units 9, 5 are assembled simultaneously within the base 3, assembly and positioning precision of the first and second lenses 41, 51 of the first and second lens units 4, 5 can be effectively enhanced, so that accuracy of the lens module 300 after assembly on the electronic device may also be achieved.

Figure 5:
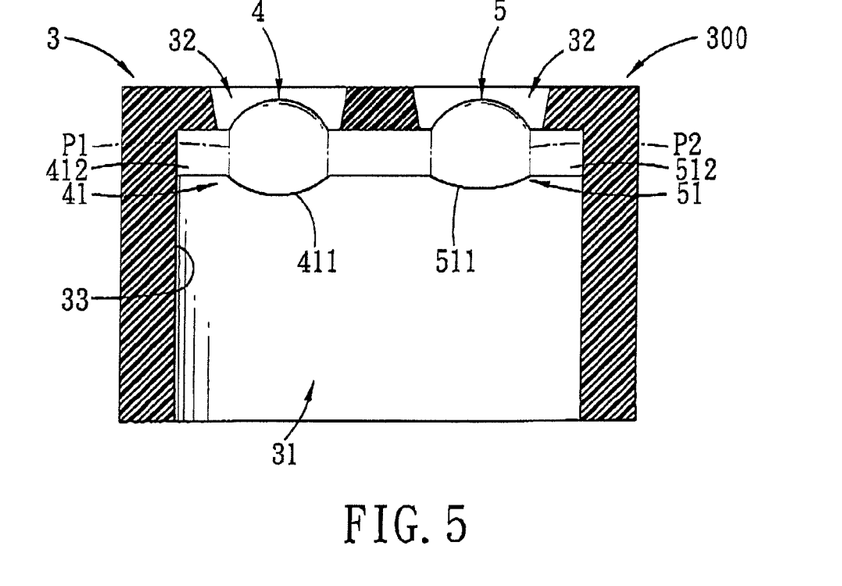
FIG. 5 is a sectional view of the lens module of the first preferred embodiment, illustrating the first and second lenses being connected integrally to each other as one piece.

It is worth mentioning that although the first and second lens units 4, 5 in FIG. 3 are exemplified as respectively having first and second lenses 41, 51, in actual practice, the structure of the first and second lens units 4, 5 may be modified according to actual requirements. For example, the number of lenses of the first and second lens units 4, 5 may be the same or different; the first and second lens units 4, 5 may be formed separately (see FIG. 3) or connected integrally to each other as one piece (see FIG. 5); the first or second lens unit 4, 5 may include a plurality of lenses that are spaced apart from each other in a top-to-bottom direction (see FIG. 6); the lenses of the first and second lens units 4, 5 may have a concave or convex surface (see FIG. 6), or a flat surface (not shown), and the curvature parameter of the lenses may be the same or different; and the material of the lenses of the first and second lens units 4, 5 may be the same or different.

Figure 6:
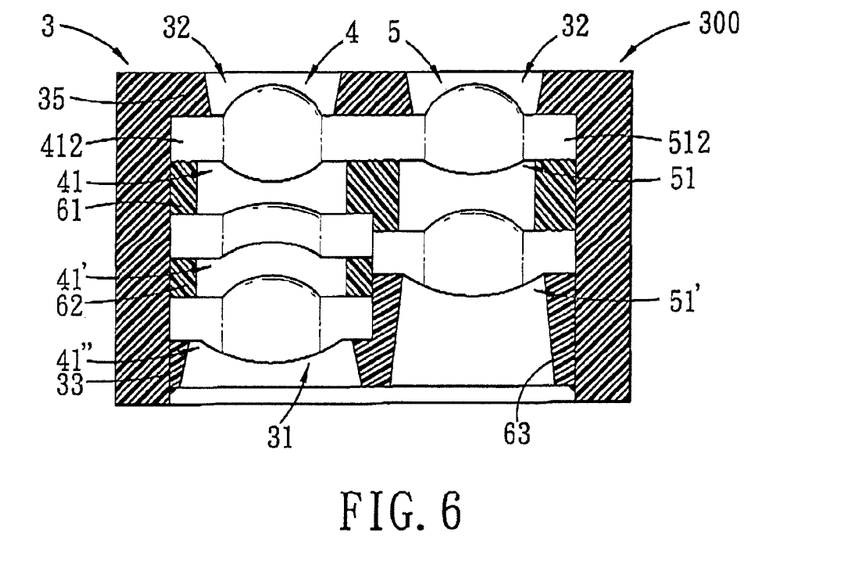
FIG. 6 is a sectional view of an alternative form of the lens module of the first preferred embodiment, illustrating a first lens unit including a plurality of first lenses arranged in a top-to-bottom direction, and a second lens unit including a plurality of second lenses arranged in a top-to-bottom direction.

FIG. 6 illustrates an alternative form of the lens module 300 of the first preferred embodiment. The first lens unit 4 includes three first lenses 41, 41', 41" spaced apart from each other in a top-to-bottom direction. The second lens unit 5 includes two second lenses 51, 51' spaced apart from each other in a top-to-bottom direction. The first lens 41 is connected integrally as one piece with the second lens 51, and the fixed portions 412, 512 thereof abut against an inner face of a top wall 35 of the base 3. Although the first and second lenses 41', 51' abut against each other in FIG. 6, they may be designed to be spaced apart from each other in a left-to-right manner. A partition ring or spacer 61 is disposed between the integrally formed first and second lenses 41, 51 and the spaced-apart first and second lenses 41', 51'. Another partition ring or spacer 62 is disposed between the first lens 41' and the first lens 41". A positioning ring 63 abuts against a bottom end of the first lens 41" and a bottom end of the second lens 51' so as to press tightly and inwardly the first lens 41" and the second lens 51'. The positioning ring 63 may be adhered to the inner wall face 33 of the base 3 through an adhesive. As such, the first lenses 41, 41', 41" and the second lenses 51, 51' can be stably positioned within the receiving space 31.

It should be noted that whether the first lenses 41, 41', 41" and the second lenses 51, 51' should be configured as one piece or separate pieces will depend upon the actual requirements. For example, in FIG. 6, the first and second lenses 41, 51, which are formed as one piece, may be formed separately and spaced apart from each other, and the first and second lenses 41', 51', which are formed as separate pieces and may be spaced apart in a left-to-right manner, may be formed integrally as one piece.

Figure 7:
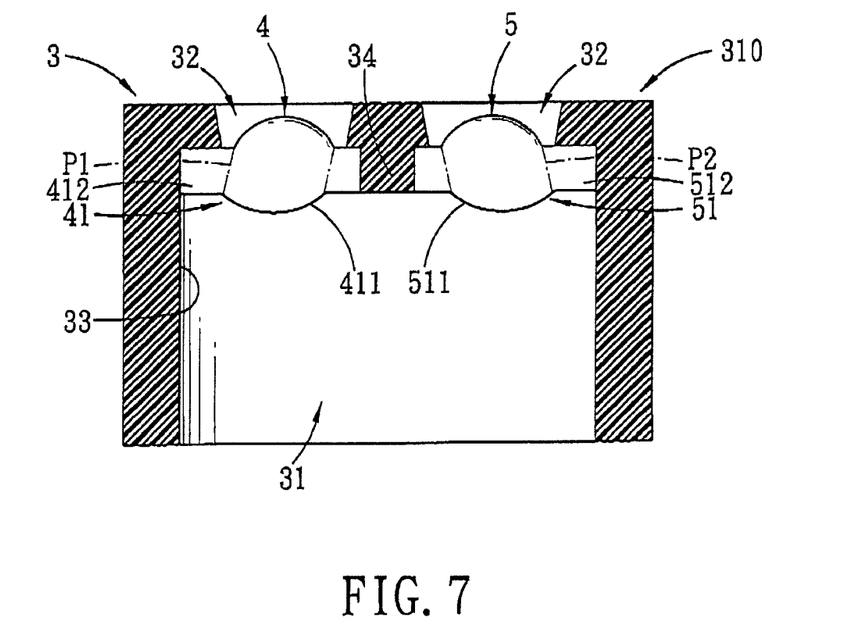
FIG. 7 is a sectional view of a lens module according to the second preferred embodiment of this invention, illustrating light-penetrating portions of first and second lenses respectively inclining inwardly.
Figure 8:
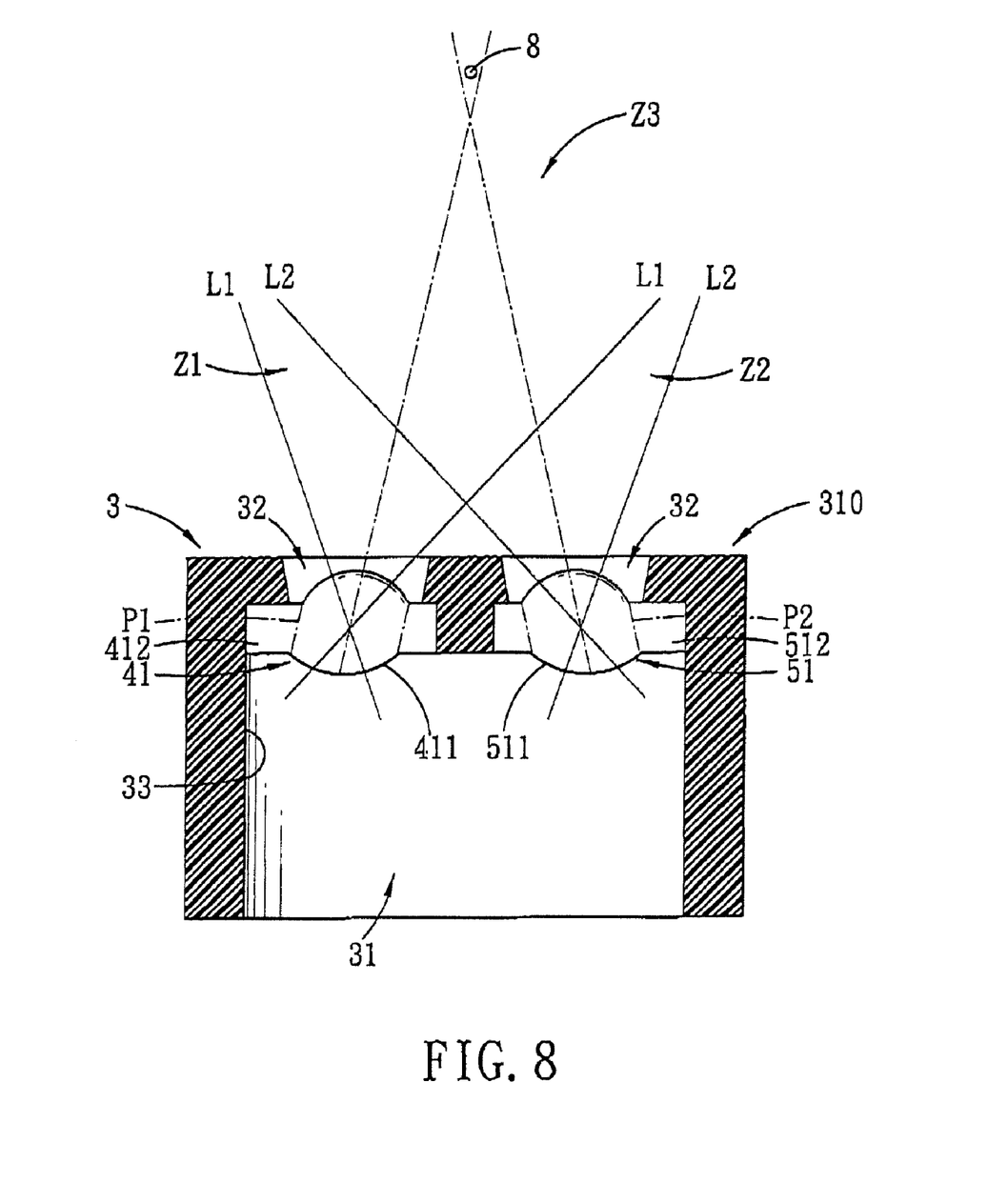
FIG. 8 is a schematic view, illustrating how the lens module of the second preferred embodiment forms an image of an object, where first and second light communicating paths intersect each other in an extended direction and in an area external to a base.
Figure 9:
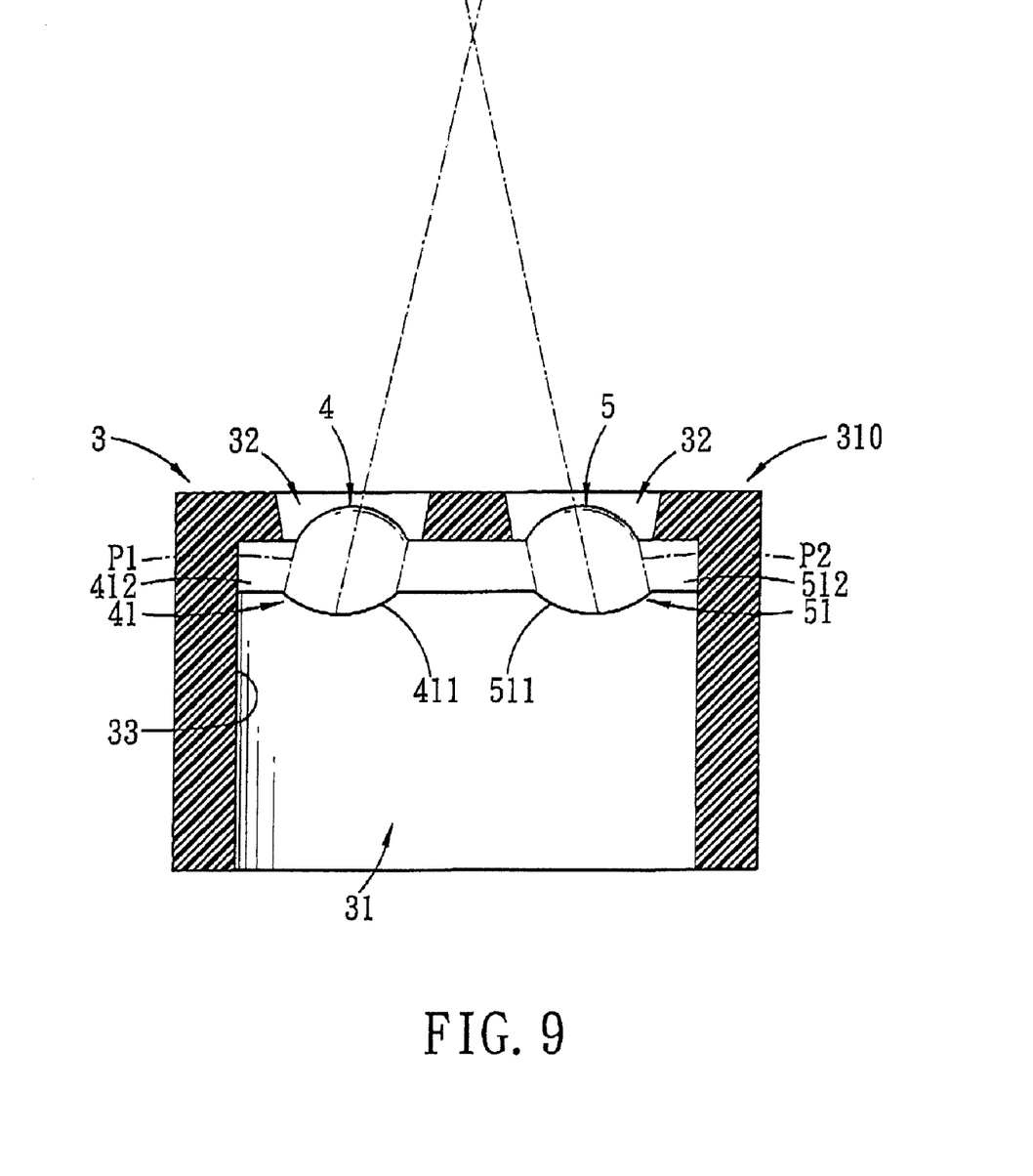
FIG. 9 is a sectional view of the lens module of the second preferred embodiment, illustrating the first and second lenses being connected integrally to each other as one piece.

FIGS. 7 and 8 illustrate a lens module 310 according to the second preferred embodiment of the present invention. The whole structure of the lens module 310 is similar to that of the first preferred embodiment. The difference resides in that the light-penetrating portions 411, 511 of the first and second lenses 41, 51 are inclined inwardly, so that the first and second light communicating paths (P1, P2) intersect each other in an extended direction (shown in FIG. 8 in imaginary lines) and in an area external to the base 3. As a result, an overlapping region (Z3) of the viewable regions (Z1, Z2) of the first and second lens units 4, 5 has a larger range as compared to that of the first preferred embodiment, so that the region of the object 8 formed on the sensor element is larger, and differentiation between the coordinate position and the change in the coordinate position of the object 8 in three dimensional space can be effectively and accurately realized. Further, during manufacture of the lens module 310, the first and second lenses 41, 51 can be connected integrally to each other as one piece, as shown in FIG. 9, and can be adhered to the inner wall face 33 of the base 3 through the fixed portions 412, 512 therefor.

Figure 10:
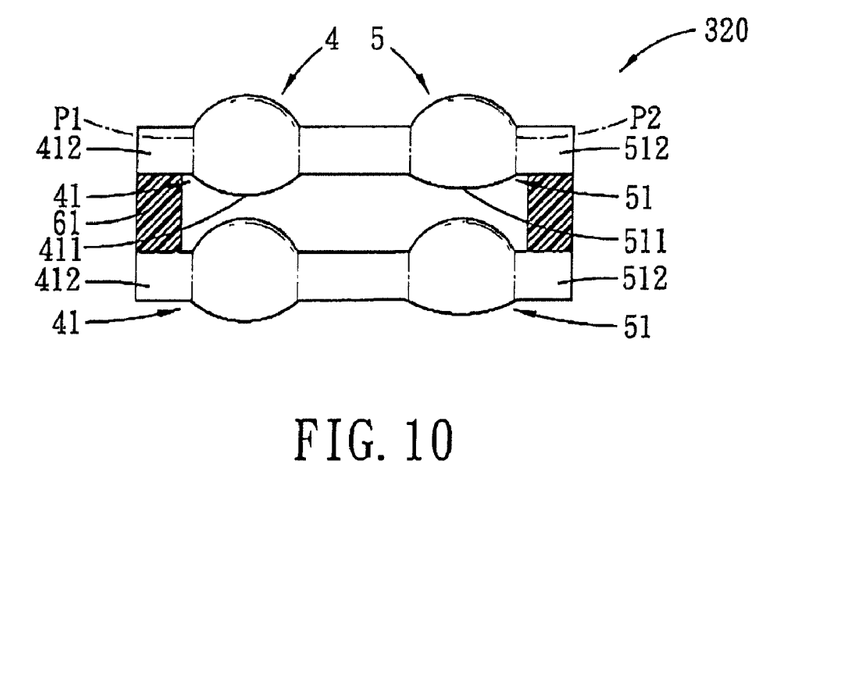
FIG. 10 is a sectional view of a lens module according to the third preferred embodiment of this invention, illustrating first and second lenses being connected integrally to each other as one piece.

FIG. 10 illustrates a lens module 320 according to the third preferred embodiment of the present invention. The components and manufacturing method of the lens module 320 are different from that of the first preferred embodiment. The difference resides in that the lens module 320 is configured using a wafer-level optics techniques, and the base 3 shown in FIG. 3 is dispensed herewith.

Two methods of manufacturing the lens module 320 are described herein. The first method is, on a wafer (not shown) which is made of glass and which is formed with a plurality of sets of one-piece integrally formed first and second lenses 41, 51 of the first and second lens units 4, 5 (only two sets of the first and second lens units 4, 5 are shown in FIG. 10), a partition ring or spacer 61 is adhered to bottom faces of each set of the first and second lens units 4, 5. Afterwards, another wafer (not shown), which is made of glass and which is also formed with a plurality of sets of one-piece integrally formed first and second lenses 41, 51 of the first and second lens units 4, 5, is stacked below the aforesaid wafer and is adhered to a bottom end of the partition ring 61 of each set of the first and second lens units 4, 5. Thereafter, the first and second lenses 41, 51 of each set of the first and second lens units 4, 5 is cut-off from the wafer in a top-to-bottom direction, thereby forming a plurality of the lens modules 320. The second method is, on a wafer (not shown), which is made of glass and which is formed with a plurality of sets of one-piece integrally formed first and second lenses 41, 51 of the first and second lens units 4, 5, the first and second lens 41, 51 of each set of the first and second lens units 4, 5 is cut-off from the wafer in a top-to-bottom direction, after which a partition ring or spacer 61 is adhered to and is disposed between the first and second lenses 41, 51 of each two sets of the first and second lens units 9, 5, thereby forming the lens module 320, as shown in FIG. 10.

Figure 11:
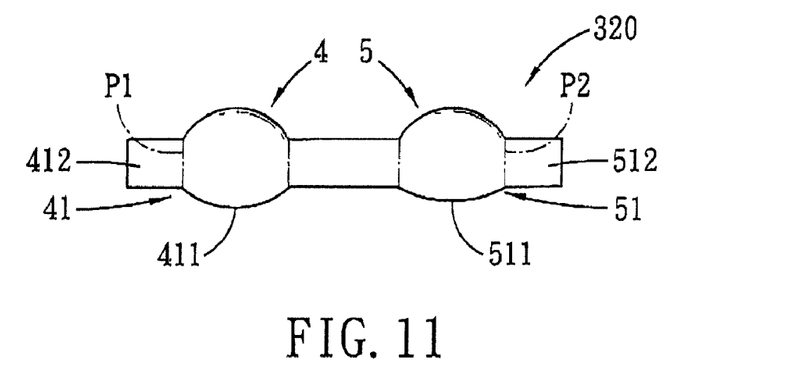
FIG. 11 illustrates the first and second lenses of the third preferred embodiment after being cut from a wafer.

During manufacture of the lens module 320, each set of the first and second lens units 4, 5 may be directly cut-off from the wafer so as to form the lens module 320, as shown in FIG. 11.

In summary, through the first and second lenses 41, 51 of the first and second lens units 4, 5 which are arranged in a left-to-right manner and which respectively define the first and second light communicating paths (P1, P2), the lens module 300, 310, 320 of each embodiment involves steps of assembly that are reduced to a minimum so as to shorten assembly time, thereby reducing the manufacturing costs thereof to a large extent. Further, assembly and positioning precision of the first and second lenses 41, 51 of the first and second lens units 4, 5 can be effectively enhanced, so that accuracy of the lens module 300, 310, 320 after assembly on the electronic device may also be achieved. Hence, the object of the present invention is achieved.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A lens module, comprising:
   a base defining a receiving space and having two spaced-apart through holes for fluid communication of said receiving space with an area external to said base;
   a first lens unit including a first lens disposed within said receiving space; and
   a second lens unit including a second lens disposed within said receiving space, said second lens unit laterally displaced from said first lens unit;
   wherein each of said first and second lenses includes a respective light-penetrating portion in communication with a respective one of said through holes, and each said light-penetrating portion has a concave surface;

wherein said light-penetrating portion of said first lens defines a first light communicating path that corresponds in position to one of said through holes, and said light-penetrating portion of said second lens defines a second light communicating path that corresponds in position to the other one of said through holes;

wherein two intersecting lines passing through said first light communicating path via a corresponding one of said through holes define a viewable region of said first lens unit therebetween, and two intersecting lines passing through said second light communicating path via the other one of said through holes define a viewable region of said second lens unit therebetween;

wherein said first and second lenses simultaneously permit corresponding light rays within corresponding viewable regions in a same direction to pass therethrough via said first and second light communication paths, respectively; and wherein an optical axis of each of said first and second lenses inclines inwardly to increase an overlapping area of said viewable regions of said first and second lens units.

2. The lens module of claim 1, wherein said second lens is connected integrally as one piece with said first lens, each of said first and second lenses further having a fixed portion fixed to said base.

3. The lens module of claim 1, wherein said first and second lenses are spaced apart from each other in a left-to-right manner, each of said first and second lenses further having a fixed portion fixed to said base.

4. The lens module of claim 1, wherein said first lens unit includes two said first lenses one being disposed above the other, said second lens unit including two said second lenses one being disposed above the other, a top one of said first lenses being connected integrally as one piece with a top one of said second lenses, a bottom one of said first lenses being spaced apart from a bottom one of said second lenses in a left-to-right manner, said integrally formed first and second lenses and said spaced-apart first and second lenses being provided with a partition ring therebetween.

5. The lens module of claim 4, further comprising a positioning ring abutting against said bottom ones of said first and second lenses so as to position said first and second lens units within said receiving space.

6. A lens module, comprising:
a first lens unit including at least one first lens having a light-penetrating portion that defines a first light communicating path that has a concave surface; and
a second lens unit including at least one second lens having a light-penetrating portion that defines a second light communicating path and that has a concave surface, said second lens being connected integrally as one piece with said first lens;
a base having a plurality of spaced-apart through holes;
wherein two intersecting lines passing through said first light communicating path via a corresponding one of said through holes define a viewable region of said first lens unit there between, and two intersecting lines passing through said second light communicating path via the other one of said through holes define a viewable region of said second lens unit there between;
wherein said first and second lenses simultaneously permit corresponding light rays within corresponding viewable regions in a same direction to pass there through via said first and second light communication paths, respectively.

7. The lens module of claim 6, wherein said first lens unit includes two said first lenses, said second lens unit including two said second lenses, each of said first lenses being connected integrally as one piece with a respective one of said second lenses, one of said integrally formed first and second lenses and the other one of said integrally formed first and second lenses being spaced apart from each other in a top-to-bottom direction and being provided with a partition ring therebetween.

* * * * *